US012596314B2

(12) United States Patent
Manabe et al.

(10) Patent No.: US 12,596,314 B2
(45) Date of Patent: Apr. 7, 2026

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Kohei Manabe, Kanagawa (JP); Yukiaki Nakamura, Kanagawa (JP); Takahisa Tatekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 594 days.

(21) Appl. No.: 18/155,039

(22) Filed: Jan. 16, 2023

(65) Prior Publication Data

US 2023/0384701 A1 Nov. 30, 2023

(30) Foreign Application Priority Data

May 27, 2022 (JP) ................................ 2022-086991

(51) Int. Cl.
*G03G 9/09* (2006.01)
*G03G 15/01* (2006.01)
*G03G 15/08* (2006.01)

(52) U.S. Cl.
CPC ......... *G03G 9/0926* (2013.01); *G03G 9/0908* (2013.01); *G03G 9/091* (2013.01); (Continued)

(58) Field of Classification Search
CPC .... G03G 9/0926; G03G 9/0908; G03G 9/091; G03G 9/0912; G03G 9/0924; G03G 15/0126; G03G 15/0865
See application file for complete search history.

(56) References Cited

U.S. PATENT DOCUMENTS 5,554,480 A * 9/1996 Patel .................... G03G 9/0926 430/108.1
8,293,440 B2 * 10/2012 Nakamura ........... G03G 9/0806 430/108.1
(Continued)

FOREIGN PATENT DOCUMENTS

JP 2011133804 7/2011
JP 2018165831 10/2018
(Continued)

OTHER PUBLICATIONS

Pigment list by average particle size. Artist Pigments.org. (n.d.). https://artistpigments.org/pigments/lists/particle_size (Year: 2025).*
(Continued)

*Primary Examiner* — Mark F. Huff
*Assistant Examiner* — Boone Alexander Evans
(74) *Attorney, Agent, or Firm* — JCIPRNET

(57) ABSTRACT

An electrostatic charge image developing toner contains toner particles that contain an organic colorant and a binder resin, in which the organic colorant includes a non-fluorescent organic pigment and a fluorescent organic pigment, a total content of the organic colorant is 5% by mass or more and 20% by mass or less with respect to a total mass of the toner particles, and a specific gravity D1 of the non-fluorescent organic pigment and a specific gravity D2 of the fluorescent organic pigment satisfy both of Formulas (1) and (2).

$$D1 \geq 2.0 \quad \text{Formula (1)}$$

$$D1 - D2 \geq 0.6 \quad \text{Formula (2).}$$

20 Claims, 2 Drawing Sheets

(52) U.S. Cl.
CPC ......... *G03G 9/0912* (2013.01); *G03G 9/0924* (2013.01); *G03G 15/0126* (2013.01); *G03G 15/0865* (2013.01)

(56) References Cited

U.S. PATENT DOCUMENTS

| | | | | |
|---|---|---|---|---|
| 2005/0195420 | A1 * | 9/2005 | Gerrits | G03G 15/01 358/1.13 |
| 2016/0177100 | A1 * | 6/2016 | Mochizuki | C07D 471/04 428/195.1 |
| 2021/0253845 | A1 | 8/2021 | Nakamura et al. | |

FOREIGN PATENT DOCUMENTS

| | | |
|---|---|---|
| JP | 2018165851 | 10/2018 |
| JP | 2021127431 | 9/2021 |

OTHER PUBLICATIONS

"Notice of Reasons for Refusal of Japan Counterpart Application", issued on Dec. 9, 2025, with English translation thereof, p. 1-p. 5.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-086991 filed May 27, 2022.

BACKGROUND

(i) Technical Field

The present disclosure relates to an electrostatic charge image developing toner, an electrostatic charge image developer, a toner cartridge, a process cartridge, an image forming apparatus, and an image forming method.

(ii) Related Art

JP2018-165851A discloses an electrostatic charge image developing magenta toner consisting of magenta toner particles containing a binder resin and a coloring material, in which the coloring material contains at least one kind of visible light-excited nitride phosphor, and the visible light-excited nitride phosphor contains a host crystal and an activator and has an average dispersed particle size of 50 nm or more and 500 nm or less.

JP2011-133804A discloses an electrostatic charge image developing white toner containing a binder resin, a first white pigment, and a second white pigment, in which a specific gravity D1 of the first white pigment satisfies a relationship of 3.5<D1<6.0, and a specific gravity D2 of the second white pigment satisfies a relationship of 0.3<D2<1.2.

SUMMARY

Aspects of non-limiting embodiments of the present disclosure relate to an electrostatic charge image developing toner from which an image having higher bending resistance, higher peelability, and higher reflectance is obtained, compared to an electrostatic charge image developing toner which contains toner particles containing an organic colorant and a binder resin, and in which the organic colorant includes a non-fluorescent organic pigment and a fluorescent organic pigment, a total content of the organic colorant is less than 5% by mass or more than 20% by mass with respect to a total mass of the toner particles, or a specific gravity D1 of the non-fluorescent organic pigment and a specific gravity D2 of the fluorescent organic pigment do not satisfy any of Formulas (1) and (2).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspects.

According to an aspect of the present disclosure, there is provided an electrostatic charge image developing toner that contains toner particles containing an organic colorant and a binder resin, in which the organic colorant includes a non-fluorescent organic pigment and a fluorescent organic pigment, a total content of the organic colorant is 5% by mass or more and 20% by mass or less with respect to a total mass of the toner particles, and a specific gravity D1 of the non-fluorescent organic pigment and a specific gravity D2 of the fluorescent organic pigment satisfy both of Formulas (1) and (2).

$$D1 \geq 2.0 \quad \text{Formula (1)}$$

$$D1-D2 \geq 0.6 \quad \text{Formula (2)}$$

BRIEF DESCRIPTION OF THE DRAWINGS

Exemplary embodiment(s) of the present invention will be described in detail based on the following figures, wherein.

DETAILED DESCRIPTION

Figure 1:
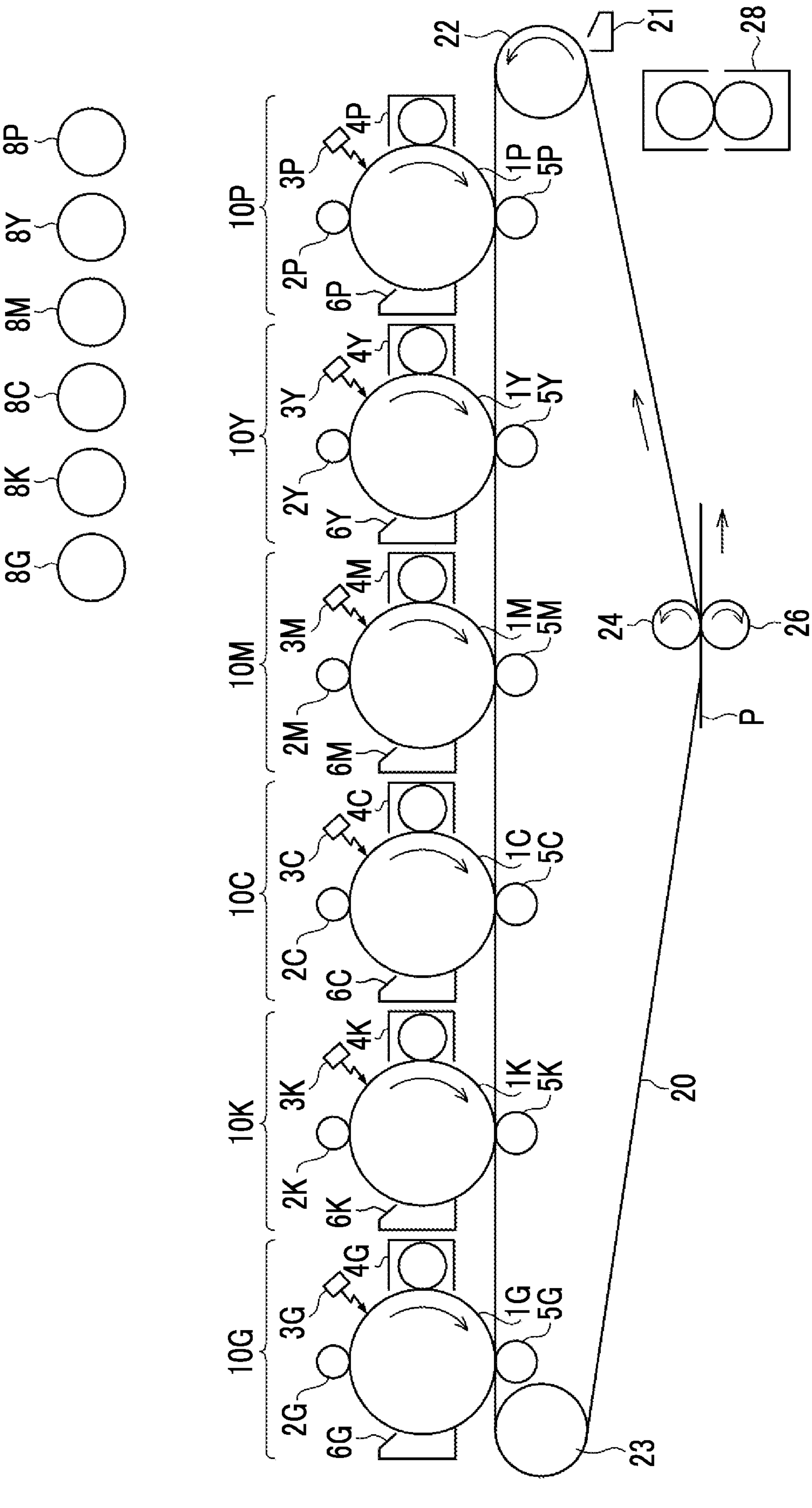
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "electrostatic charge image developing toner" is also called "toner", "fluorescent green toner" is also called "green toner", "electrostatic charge image developer" is also called "developer", and "electrostatic charge image developing carrier" is also called "carrier".

Electrostatic Charge Image Developing Toner

The electrostatic charge image developing toner according to the present exemplary embodiment contains toner particles containing an organic colorant and a binder resin, in which the organic colorant includes a non-fluorescent organic pigment and a fluorescent organic pigment, a total content of the organic colorant is 5% by mass or more and 20% by mass or less with respect to a total mass of the toner particles, and a specific gravity D1 of the non-fluorescent organic pigment and a specific gravity D2 of the fluorescent organic pigment satisfy both of Formulas (1) and (2).

$$D1 \geq 2.0 \qquad \text{Formula (1)}$$

$$D1 - D2 \geq 0.6 \qquad \text{Formula (2)}$$

The electrostatic charge image developing toner according to the present exemplary embodiment is, for example, preferably a fluorescent toner, more preferably a fluorescent green toner, a fluorescent pink toner, a fluorescent red toner, a fluorescent orange toner, a fluorescent yellow toner, or a fluorescent purple toner, even more preferably a fluorescent green toner, a fluorescent red toner, or a fluorescent orange toner, and particularly preferably a fluorescent green toner.

The electrostatic charge image developing toner according to the present exemplary embodiment is, for example, preferably a toner having a core/shell structure.

In the related art, a toner containing fluorescent colorants is prepared by combining a fluorescent colorant for bringing fluorescence intensity and a non-fluorescent colorant for toning. Therefore, in this toner, a colorant content is higher than usual, which often leads to the deterioration of bending strength of an image. In a case where a dye is used as a fluorescent colorant, although it is possible to improve the bending strength by reducing the colorant content to an average level, there is a problem in that the dye molecules dispersed in the toner lower Tg of the binder resin and thus deteriorate peelability.

The electrostatic charge image developing toner according to the present exemplary embodiment contains a non-fluorescent organic pigment and a fluorescent organic pigment as an organic colorant, a total content of the organic colorant in the toner is 5% by mass or more and 20% by mass or less with respect to a total mass of the toner, and a specific gravity D1 of the non-fluorescent organic pigment and a specific gravity D2 of the fluorescent organic pigment satisfy both the Formulas (1) and (2). Presumably, as a result, from this toner, as will be described below, an image may be obtained which has excellent bending resistance and peelability and has a high reflectance.

A non-fluorescent organic pigment for toning absorbs light including an excitation wavelength of a fluorescent organic pigment. Having a high electron density, a non-fluorescent organic pigment with a high specific gravity scatters a large amount of light as soon as the pigment absorbs light. Therefore, the light having an excitation wavelength that can be absorbed into the fluorescent organic pigment in the image does not decrease, and the fluorescence intensity of the toner is kept high. Accordingly, in a case where the specific gravity of the non-fluorescent organic pigment is 2.0 or less, less light is scattered, the amount of light having an excitation wavelength is reduced, and the fluorescence intensity is reduced.

Furthermore, in a portion where the non-fluorescent organic pigment and the fluorescent organic pigment are close to each other, the larger the difference in specific gravity between the non-fluorescent organic pigment and the fluorescent organic pigment (≥0.6), the larger the difference in electron density, and light is also strongly scattered in a boundary portion between the non-fluorescent organic pigment and the fluorescent organic pigment.

Consequently, light reaches the fluorescent organic pigment, and fluorescence intensity increases.

Therefore, in a case where an organic pigment having a high specific gravity (2.0 or more) is used as a non-fluorescent organic pigment for toning, and the difference in specific gravity between the fluorescent pigment and the non-fluorescent pigment is large (0.6 or more), the fluorescence intensity increases. Accordingly, the colorant content can be reduced to the same level of colorant content in a normal toner, the reflectance of the obtained image is high, the bending strength of the obtained image is improved, and the peelability is also excellent because the amount of pigments in the image is appropriate.

In addition, because the reflectance of the obtained image is high, the reproducibility of hues with high chroma and brightness is excellent.

In the present exemplary embodiment, a fluorescent organic pigment refers to an organic pigment that emits light by light energy from the outside, and a non-fluorescent organic pigment refers to an organic pigment that does not emit light by light energy from the outside. Generally, a fluorescent organic pigment shows color by reflected light and light emission, and a non-fluorescent organic pigment shows color only by reflected light.

Hereinafter, the configuration of the electrostatic charge image developing toner according to the present exemplary embodiment will be specifically described.

Toner Particles

The toner particles contain a non-fluorescent organic pigment and a fluorescent organic pigment as an organic colorant and a binder resin, and contain, as necessary, a release agent and other additives.

In the electrostatic charge image developing toner according to the present exemplary embodiment, the specific gravity D1 of the non-fluorescent organic pigment and the specific gravity D2 of the fluorescent organic pigment satisfy Formula (1). From the viewpoint of bending resistance and reflectance of the obtained image, for example, the specific gravity D1 and the specific gravity D2 preferably satisfy Formula (1Z), more preferably satisfy Formula (1A), even more preferably satisfy Formula (1), and particularly preferably satisfy Formula (1C).

$$D1 \geq 2.1 \qquad \text{Formula (1Z)}$$

$$D1 \geq 2.5 \qquad \text{Formula (1A)}$$

$$3.5 \geq D1 \geq 2.5 \qquad \text{Formula (1B)}$$

$$3.0 \geq D1 \geq 2.5 \qquad \text{Formula (1C)}$$

In the electrostatic charge image developing toner according to the present exemplary embodiment, the specific gravity D1 of the non-fluorescent organic pigment and the specific gravity D2 of the fluorescent organic pigment satisfy Formula (2). From the viewpoint of bending resistance and reflectance of the obtained image, for example, the specific gravity D1 and the specific gravity D2 preferably satisfy Formula (2A), more preferably satisfy Formula (2B), even more preferably satisfy Formula (2C), and particularly preferably satisfy Formula (2D).

$$D1-D2\geq 0.75 \quad \text{Formula (2A)}$$

$$D1-D2\geq 1.0 \quad \text{Formula (2B)}$$

$$2.0\geq D1-D2\geq 1.0 \quad \text{Formula (2C)}$$

$$1.6\geq D1-D2\geq 1.0 \quad \text{Formula (2D)}$$

The specific gravity of a pigment in the present exemplary embodiment is measured by the following method.

The specific gravity is measured by the following operation based on 5-2-1 of JIS K 0061 (2001) by using a Le Chatelier specific gravity bottle.

(1) Ethyl alcohol (250 ml) is put in a Le Chatelier specific gravity bottle, and the bottle is adjusted such that the meniscus comes to the position of the scale.

(2) The specific gravity bottle is immersed in a constant-temperature water bath, and when the liquid temperature reaches 20.0° C.±0.2° C., the position of the meniscus is accurately read on the scale of the specific gravity bottle (accuracy 0.0025 ml).

(3) A sample weighing 100 g is collected.

(4) The collected sample is put in a specific gravity bottle, and bubbles are removed.

(5) The specific gravity bottle is immersed in a constant-temperature bath, and when the liquid temperature reaches 20.0° C.±0.2° C., the position of the meniscus is accurately read on the scale of the specific gravity bottle (accuracy 0.0025 ml).

(6) The specific gravity is calculated by the following formulas.

$$D=W/(L2-L1) \quad \text{Formula:}$$

$$S=D/0.9982 \quad \text{Formula:}$$

In the formulas, D is a density (g/cm$^3$, 20° C.) of the sample, S is a specific gravity (20° C.) of the sample, W is an apparent mass (g) of the sample, L1 is a reading (ml, 20° C.) of the meniscus before the sample is put in the specific gravity bottle, L2 is a reading (ml, 20° C.) of the meniscus after the sample is put in the specific gravity bottle, and 0.9982 is a density (g/cm$^3$) of water at 20° C.

Organic Colorant

The toner particles contain an organic colorant, the organic colorant includes a non-fluorescent organic pigment and a fluorescent organic pigment, and the total content of the organic colorant is 5% by mass or more and 20% by mass or less with respect to the total mass of the toner particles.

The total content of the organic colorant is 5% by mass or more and 20% by mass or less with respect to the total mass of the toner particles. From the viewpoint of bending resistance and peelability of the obtained image, the total content of the organic colorant is, for example, preferably 6% by mass or more and 18% by mass or less, and more preferably 8% by mass or more and 17% by mass or less.

From the viewpoint of bending resistance and reflectance of the obtained image, for example, the content of the fluorescent organic pigment is preferably higher than the content of the non-fluorescent organic pigment.

In addition, from the viewpoint of bending resistance and reflectance of the obtained image, a mass-based ratio M2/M1 of a content M2 of the non-fluorescent organic pigment to a content M1 of the fluorescent organic pigment in the toner particles is, for example, preferably 0.05 or more and 1.5 or less.

From the viewpoint of bending resistance and reflectance of the obtained image, the ratio M2/M1 is 0.05 or more, for example, preferably 0.1 or more, and more preferably 0.3 or more.

From the viewpoint of bending resistance and reflectance of the obtained image, the ratio M2/M1 is 1.5 or less, for example, preferably 1.0 or less, more preferably less than 1.0, and even more preferably 0.8 or less.

Fluorescent Organic Pigment

The toner particles contain a fluorescent organic pigment.

The fluorescent organic pigment is not limited in color or the like as long as the fluorescent organic pigment is a fluorescing organic pigment. Examples thereof include a fluorescent yellow organic pigment, a fluorescent pink organic pigment, a fluorescent red organic pigment, a fluorescent orange organic pigment, a fluorescent green organic pigment, a fluorescent purple organic pigment, and the like. Particularly, in a case where the non-fluorescent organic pigment is a non-fluorescent green organic pigment or a non-fluorescent red organic pigment, from the viewpoint of bending resistance and reflectance of the obtained image, for example, a fluorescent yellow organic pigment is preferable among the above.

Examples of the fluorescent organic pigment include an azomethine compound, an isoindolinone compound, a xanthene compound (including a rhodamine compound, a fluorescein compound, and an eosin compound), a naphthalene compound, and a triarylmethane compound.

Among these, as the fluorescent organic pigment, from the viewpoint of bending resistance and reflectance of the obtained image, for example, an azomethine compound is preferable, and a bisazomethine compound is more preferable.

Examples of the azomethine compound include a compound having an azomethine structure represented by $-R^1C{=}N-$ ($R^1$ is a hydrogen atom or a monovalent substituent).

Examples of the bisazomethine compound include a compound having a bisazomethine structure represented by $-R^1C{=}N-N{=}CR^2-$ ($R^1$ and $R^2$ each independently represent a hydrogen atom or a monovalent substituent) in the molecular structure.

The fluorescent organic pigment preferably has, for example, a hydrophilic group.

Examples of the hydrophilic group in the fluorescent organic pigment include a hydroxy group, primary to tertiary amino groups, a carboxy group, a sulfo group, a phosphoric acid group, and the like.

From the viewpoint of bending resistance and reflectance of the obtained image, the fluorescent organic pigment preferably has, for example, a hydroxy group as the hydrophilic group among the above.

Examples of the fluorescent organic pigment include the following azomethine compounds (1) to (3).

Azomethine compound (1)

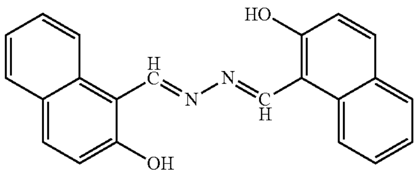

Azomethine compound (2)

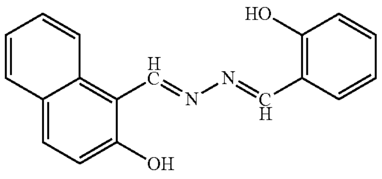

Azomethine compound (3)

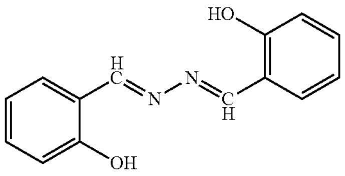

The emission peak wavelength of the azomethine compound (1) is 520 nm.

The emission peak wavelength of the azomethine compound (2) is 510 nm.

The emission peak wavelength of the azomethine compound (3) is 520 nm.

As the fluorescent organic pigment, for example, an azomethine compound derivative is preferable, and a boron difluoride derivative of an azomethine compound is more preferable.

Examples of the boron difluoride derivative of an azomethine compound include the following compounds.

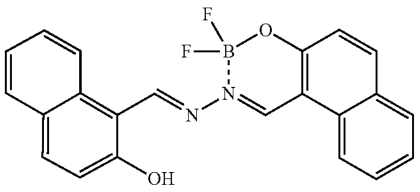

The fluorescent organic pigment is, for example, preferably at least one kind of compound selected from the group consisting of the azomethine compound (1), the azomethine compound (2), the azomethine compound (3), and boron difluoride derivatives of these.

As the fluorescent organic pigment, for example, C.I. Pigment Yellow 101 or a boron difluoride derivative of C.I. Pigment Yellow 101 is preferable, and C.I. Pigment Yellow 101 is more preferable. C.I. Pigment Yellow 101 is the azomethine compound (1).

In order that the bending resistance and peelability of the obtained image, dispersibility in the toner particles, color showing properties on a recording medium, fixing properties on a recording medium, and the like are achieved in a well-balanced manner, a volume-average particle size D50v of the fluorescent organic pigment is, for example, preferably 30 nm or more and 800 nm or less, more preferably 100 nm or more and 500 nm or less, and even more preferably 200 nm or more and 400 nm or less.

The volume-average particle size of the pigment is measured using a laser diffraction-type particle size distribution analyzer (for example, LA-700 manufactured by Horiba, Ltd.) by dispersing the pigment in an aqueous solution of a surfactant. The volume-based particle size distribution is plotted from the small particle size, and the particle size at which the cumulative percentage of the particles reaches 50% is adopted as the volume-average particle size.

The toner particles may contain one kind of fluorescent organic pigment alone or two or more kinds of fluorescent organic pigments. From the viewpoint of brightness and chroma of the obtained image, for example, it is preferable that the toner particles contain one kind of fluorescent organic pigment alone.

From the viewpoint of bending resistance and peelability of the obtained image, the content of the fluorescent organic pigment with respect to the total mass of the toner particles is, for example, preferably 1% by mass or more and 19.9% by mass or less, more preferably 0.3% by mass or more and 18% by mass or less, and particularly preferably 5% by mass or more and 15% by mass or less.

Non-Fluorescent Organic Pigment

The toner particles contain a non-fluorescent organic pigment.

The non-fluorescent organic pigment is not limited in color or the like as long as the non-fluorescent organic pigment is an organic pigment that does not fluoresce. Examples thereof include a non-fluorescent green organic pigment, a non-fluorescent red organic pigment, a non-fluorescent yellow organic pigment, a non-fluorescent pink organic pigment, a non-fluorescent orange organic pigment, a non-fluorescent purple organic pigment, and the like. Among these, for example, a non-fluorescent green pigment or a non-fluorescent red pigment is preferable, and a non-fluorescent green pigment is more preferable.

From the viewpoint of bending resistance and reflectance of the obtained image, the non-fluorescent organic pigment preferably has, for example, a halogen atom.

Examples of the halogen atom in the non-fluorescent organic pigment include a fluorine atom, a chlorine atom, a bromine atom, and an iodine atom.

From the viewpoint of bending resistance and reflectance of the obtained image, for example, the non-fluorescent organic pigment preferably has at least one kind of atom selected from the group consisting of a chlorine atom and a bromine atom as the halogen atom, more preferably has a bromine atom as the halogen atom, and particularly preferably has a chlorine atom and a bromine atom as the halogen atom, among the above.

In addition, from the viewpoint of bending resistance and reflectance of the obtained image, for example, the non-fluorescent organic pigment preferably has 2 or more halogen atoms, more preferably has 4 or more halogen atoms, even more preferably has 6 or more halogen atoms, and particularly preferable has 8 or more and 32 or less halogen atoms.

Examples of the non-fluorescent organic pigment include a halogenated phthalocyanine compound and a lake pigment of a halogenated triphenylmethane dye.

As the non-fluorescent organic pigment, for example, a halogenated phthalocyanine compound is preferable, at least one kind of compound selected from the group consisting of halogenated copper phthalocyanine and halogenated zinc phthalocyanine is more preferable, and halogenated copper phthalocyanine is even more preferable.

Examples of the halogenated copper phthalocyanine include C.I. Pigment Green 7 (specific gravity 2.1, reflection peak wavelength 500 nm, having 16 chlorine atoms) and C.I. Pigment Green 36 (specific gravity 2.9, reflection peak wavelength 510 nm, having 10 chlorine atoms and 6 bromine atoms).

Examples of the non-fluorescent organic pigment include an anthraquinone compound.

Examples of the anthraquinone compound include C.I. Pigment Red 168 (specific gravity 2.1, having 2 bromine atoms) and C.I. Pigment Red 216 (specific gravity 2.8, having 3 bromine atoms).

The non-fluorescent organic pigment is, for example, preferably at least one kind of pigment selected from the group consisting of C.I. Pigment Green 7, C.I. Pigment Green 36, C.I. Pigment Red 168, and C.I. Pigment Red 216, and more preferably at least one kind of pigment selected from the group consisting of C.I. Pigment Green 36 and C.I. Pigment Red 216.

In order that the reflectance of the obtained image, dispersibility in the toner particles, color showing properties on a recording medium, fixing properties on a recording medium, and the like are achieved in a well-balanced manner, a volume-average particle size D50v of the non-fluorescent organic pigment is, for example, preferably 50 nm or more and 500 nm or less, more preferably 80 nm or more and 400 nm or less, even more preferably 100 nm or more and 300 nm or less, and particularly preferably 120 nm or more and 200 nm or less.

The toner particles may contain one kind of non-fluorescent organic pigment alone or two or more kinds of non-fluorescent organic pigments.

From the viewpoint of bending resistance and peelability of the obtained image, the content of the non-fluorescent organic pigment with respect to the total amount of the toner particles is, for example, preferably 0.1% by mass or more and 19.9% by mass or less, more preferably 0.5% by mass or more and 15% by mass or less, even more preferably 1% by mass or more and 10% by mass or less, and particularly preferably 2% by mass or more and 8% by mass or less.

From the viewpoint of bending resistance and peelability of the obtained image, a ratio D1/D2 of a volume-average particle size D1 of the fluorescent organic pigment to a volume-average particle size D2 of the non-fluorescent organic pigment is, for example, preferably 1 or more and 3 or less, more preferably 1.2 or more and 2.5 or less, and even more preferably 1.5 or more and 2 or less.

The toner particles may contain other colorants in addition to the fluorescent organic pigment and the non-fluorescent organic pigment.

The total content of the fluorescent organic pigment and the non-fluorescent organic pigment with respect to the total amount of colorants contained in the toner particles is, for example, preferably 90% by mass or more, more preferably 95% by mass or more, and even more preferably 100% by mass.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC HCL-8120GPC manufactured by Tosoh Corporation as a measurement device, TSKgel Super HM-M (15 cm) manufactured by Tosoh Corporation as a column, and THE as a solvent. The weight-average molecular weight and the number-average molecular weight are calculated using a molecular weight calibration curve plotted using a monodisperse polystyrene standard sample from the measurement results.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Release Agent

Examples of the release agent include hydrocarbon-based wax; natural wax such as carnauba wax, rice wax, and candelilla wax; synthetic or mineral petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 m. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves so that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, $MgSO_4$, and the like.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of external additives added to the exterior of the toner particles with respect to the toner particles is, for example, preferably 0.01% by mass or more and 5% by mass or less, and more preferably 0.01% by mass or more and 2.0% by mass or less.

It is preferable that the solid image formed on coated paper by using the electrostatic charge image developing toner according to the present exemplary embodiment have, for example, a reflectance of 70% or more at the reflection peak in a spectral reflection spectrum.

Manufacturing Method of Electrostatic Charge Image Developing Toner

The electrostatic charge image developing toner according to the present exemplary embodiment is obtained by manufacturing toner particles and then adding external additives to the exterior of the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among the above methods, for example, the aggregation and coalescence method may be used for obtaining toner particles.

In a case where the toner particles are manufactured by the aggregation and coalescence method, for example, the following manufacturing method is preferable.

A manufacturing method having a step of preparing a resin particle dispersion in which resin particles to be a binder resin are dispersed (a resin particle dispersion-preparing step);

a step of preparing a fluorescent organic pigment dispersion in which a fluorescent organic pigment is dispersed (a fluorescent organic pigment dispersion-preparing step);

a step of preparing a non-fluorescent organic pigment dispersion in which a non-fluorescent organic pigment is dispersed (a non-fluorescent organic pigment dispersion-preparing step);

a step of forming aggregated particles by aggregating mixed particles in a mixed dispersion obtained by mixing together the resin particle dispersion, the fluorescent organic pigment dispersion, and the non-fluorescent organic pigment dispersion (aggregated particle-forming step); and a step of coalescing the aggregated particles by heating an aggregated particle dispersion, in which the aggregated particles are dispersed, to form toner particles (coalescence step).

Hereinafter, each of the steps will be specifically described.

Resin Particle Dispersion-Preparing Step

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 m or less, more preferably 0.08 μm or more and 0.8 μm or less, and even more preferably 0.1 μm or more and 0.6 μm or less. For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

The method of preparing a release agent particle dispersion is the same as the method of preparing the resin particle dispersion. The content of the release agent particles contained in the release agent particle dispersion is, for example, preferably 5% by mass or more and 50% by mass or less, and more preferably 10% by mass or more and 40% by mass or less.

Fluorescent Organic Pigment Dispersion-Preparing Step

The fluorescent organic pigment dispersion is prepared, for example, by dispersing the fluorescent organic pigment in a dispersion medium by using a surfactant.

Examples of the dispersion medium used for the fluorescent organic pigment dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the fluorescent organic pigment in a dispersion medium include dispersion methods using a rotary shearing homogenizer, a ball mill having media, a sand mill, a dyno mill, a key mill, and the like.

The volume-average particle size of the fluorescent organic pigment dispersed in the fluorescent organic pigment dispersion is, for example, preferably 50 nm or more and 800 nm or less, more preferably 150 nm or more and 600 nm or less, and even more preferably 250 nm or more and 400 nm or less. The particle size of the fluorescent organic pigment is adjusted by, for example, the method and time of the dispersion treatment.

The content of the fluorescent organic pigment contained in the fluorescent organic pigment dispersion is, for example, preferably 5% by mass or more and 50% by mass or less, and more preferably 10% by mass or more and 40% by mass or less.

Non-Fluorescent Organic Pigment Dispersion-Preparing Step

The non-fluorescent organic pigment dispersion is prepared, for example, by dispersing the non-fluorescent organic pigment in a dispersion medium by using a surfactant.

Examples of the dispersion medium used for the non-fluorescent organic pigment dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the non-fluorescent organic pigment in a dispersion medium include dispersion methods using a rotary shearing homogenizer, a ball mill having media, a sand mill, a dyno mill, a key mill, and the like.

The volume-average particle size of the non-fluorescent organic pigment dispersed in the non-fluorescent organic pigment dispersion is, for example, preferably 50 nm or more and 300 nm or less, more preferably 100 nm or more and 250 nm or less, and even more preferably 120 nm or more and 200 nm or less. The particle size of the non-fluorescent organic pigment is adjusted by, for example, the method and time of the dispersion treatment.

The content of the non-fluorescent organic pigment contained in the non-fluorescent organic pigment dispersion is, for example, preferably 5% by mass or more and 50% by mass or less, and more preferably 10% by mass or more and 40% by mass or less.

Aggregated Particle-Forming Step

The resin particle dispersion, the fluorescent organic pigment dispersion, the non-fluorescent organic pigment dispersion, and the release agent particle dispersion are mixed together. Then, in the mixed dispersion, the resin particles, the fluorescent organic pigment, the non-fluorescent organic pigment, and the release agent particles are hetero-aggregated such that aggregated particles are formed which have a diameter close to the diameter of the target toner particles and include the resin particles, the fluorescent organic pigment, the non-fluorescent organic pigment, and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles—30° C. and equal to or lower than the glass transition temperature of the resin particles—10° C.) such that the particles dispersed in the mixed dispersion are aggregated, thereby forming aggregated particles.

In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted so that the dispersion is acidic (for example, pH of 2 or higher and 5 or lower), a dispersion stabilizer may be added to the dispersion as necessary, and then the dispersion may be heated.

Examples of the aggregating agent include a surfactant having a polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) so that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed so as to cause the resin particles to be aggregated and adhere to the surface of the aggregated particles and to form second aggregated particles, and a step of heating a second aggregated particle dispersion in which the second aggregated particles are dispersed so as to cause the second aggregated particles to coalesce and to form toner particles having a core/shell structure.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

For example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the green toner according to the present exemplary embodiment.

The electrostatic charge image developer according to the present exemplary embodiment may be a one-component developer which contains only the electrostatic charge image developing toner according to the present exemplary embodiment or a two-component developer which is obtained by mixing together the electrostatic charge image developing toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the green toner and the carrier, represented by green toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with a surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

In the following section, as an example of the image forming apparatus according to the present exemplary embodiment, a 6-unit tandem image forming apparatus having an array of 6 image forming units will be described. The tandem image forming apparatus is not limited to this, and may be a 5-unit tandem image forming apparatus having an array of 5 image forming units, a 4-unit tandem image forming apparatus having an array of 4 image forming units, or the like.

FIG. 1 is a view schematically showing the configuration of the image forming apparatus according to the present exemplary embodiment, which shows an intermediate transfer-type 6-unit tandem image forming apparatus.

The image forming apparatus shown in FIG. 1 includes first to sixth image forming units 10P, 10Y, 10M, 10C, 10K, and 10G as electrophotographic image forming means that print out images of colors, pink (P), yellow (Y), magenta (M), cyan (C), black (K), and green (G) based on color-separated image data. These image forming units (hereinafter, simply called "units" in some cases) 10P, 10Y, 10M, 10C, 10K, and 10G are arranged in a row in the horizontal direction in a state of being spaced apart by a predetermined distance. The units 10P, 10Y, 10M, 10C, 10K, and 10G may be process cartridges that are detachable from the image forming apparatus.

In addition, for example, an aspect is also preferable in which orange (O) is used instead of pink (P) or green (G).

An intermediate transfer belt (an example of an intermediate transfer member) 20 passing through the units 10P, 10Y, 10M, 10C, 10K, and 10G extends under the units. The intermediate transfer belt 20 is looped around a driving roll 22, a support roll 23, and an opposing roll 24 that are in contact with the inner surface of the intermediate transfer belt 20, and runs toward a sixth unit 10G from a first unit 10P. An intermediate transfer member cleaning device 21 facing the driving roll 22 is provided on the side of the image holding surface of the intermediate transfer belt 20.

Toners of pink, yellow, magenta, cyan, black, and green stored in containers of toner cartridges 8P, 8Y, 8M, 8C, 8K, and 8G are supplied to developing devices (an example of developing units) 4P, 4Y, 4M, 4C, 4K, and 4G of units 10P, 10Y, 10M, 10C, 10K, and 10G respectively.

The first to sixth units 10P, 10Y, 10M, 10C, 10K, and 10G have the same configuration and perform the same operation. Therefore, in the present specification, as a representative, the sixth unit 10G that forms a green image will be described.

The sixth unit 10G has a photoreceptor 1G that acts as an image holder. Around the photoreceptor 1G, a charging roll 2G (an example of charging unit) that charges the surface of the photoreceptor 1G at a predetermined potential, an exposure device 3G (an example of electrostatic charge image forming unit) that exposes the charged surface to a laser beam based on color-separated image signals so as to form an electrostatic charge image, a developing device 4G (an example of developing unit) that develops the electrostatic charge image by supplying a toner to the electrostatic charge image, a primary transfer roll 5G (an example of primary transfer unit) that transfers the developed toner image onto the intermediate transfer belt 20, and a photoreceptor cleaning device 6G (an example of cleaning unit) that removes the residual toner on the surface of the photoreceptor 1G after the primary transfer are arranged in this order.

The primary transfer roll 5G is disposed on the inner side of the intermediate transfer belt 20, at a position facing the photoreceptor 1G. A bias power supply (not shown in the drawing) for applying a primary transfer bias is connected to primary transfer rolls 5Y, 5P, 5M, 5C, 5G, and 5K of each unit. Each bias power supply changes the transfer bias applied to each primary transfer roll under the control of a control unit not shown in the drawing.

Hereinafter, the operation that the sixth unit 10G carries out to form a green image will be described.

First, prior to the operation, the surface of the photoreceptor 1G is charged to a potential of −600 V to −800 V by the charging roll 2G.

The photoreceptor 1G is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3G, the laser beam is radiated to the surface of the charged photoreceptor 1G according to the image data for green transmitted from the control unit not shown in the drawing. As a result, an electrostatic charge image of the green image pattern is formed on the surface of the photoreceptor 1G.

The electrostatic charge image is an image formed on the surface of the photoreceptor 1G by charging. This image is a so-called negative latent image formed in a manner in which the charges with which the surface of the photoreceptor 1G is charged flow due to the reduction in the specific resistance of the portion of the photosensitive layer irradiated with the laser beam from the exposure device 3G, but the charges in a portion not being irradiated with the laser beam remain.

The electrostatic charge image formed on the photoreceptor 1G rotates to a predetermined development position as the photoreceptor 1G runs. At the development position, the electrostatic charge image on the photoreceptor 1G is developed as a toner image by the developing device 4G and visualized.

The developing device 4G contains, for example, an electrostatic charge image developer that contains at least a green toner and a carrier. By being agitated in the developing device 4G, the green toner undergoes triboelectrification, carries charges of the same polarity (negative polarity) as the charges with which the surface of the photoreceptor 1G is charged, and is held on a developer roll (an example of a developer holder). Then, as the surface of the photoreceptor 1G passes through the developing device 4G, the green toner electrostatically adheres to the neutralized latent image portion on the surface of the photoreceptor 1G, and the latent image is developed by the green toner. The photoreceptor 1G on which the green toner image is formed keeps on running at a predetermined speed, and the toner image developed on the photoreceptor 1G is transported to a predetermined primary transfer position.

In a case where the green toner image on the photoreceptor 1G is transported to the primary transfer position, a primary transfer bias is applied to the primary transfer roll 5G, and electrostatic force heading for the primary transfer roll 5G from the photoreceptor 1G acts on the toner image. As a result, the toner image on the photoreceptor 1G is transferred onto the intermediate transfer belt 20. The transfer bias applied at this time has a polarity (+) opposite to the polarity (−) of the toner. In the sixth unit 10G, the transfer bias is set, for example, to +10 μA under the control of the control unit (not shown in the drawing).

The photoreceptor 1G having transferred the toner image to the intermediate transfer belt 20 keeps rotating to come into contact with a cleaning blade included in a photoreceptor cleaning device 6G. The residual toner on the photoreceptor 1G is removed by the photoreceptor cleaning device 6G and collected.

The intermediate transfer belt 20 is sequentially transported through the first to sixth image forming units 10P, 10Y, 10M, 10C, 10K, and 10G, and the toner images of each color are superposed and transferred in layers.

The intermediate transfer belt 20, to which the toner images of six colors are transferred in layers through the first to six units, reaches a secondary transfer portion configured with the intermediate transfer belt 20, the opposing roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is supplied at a predetermined timing to the gap between the secondary transfer roll 26 and the intermediate transfer belt 20 that are in contact with each other. Furthermore, secondary transfer bias is applied to the opposing roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

The intermediate transfer belt 20 having transferred the toner image to the recording paper P keeps running to come into contact with a cleaning blade included in the intermediate transfer member cleaning device 21. The residual toner on the intermediate transfer belt 20 is removed by the intermediate transfer member cleaning device 21 and collected.

The recording paper P onto which the toner image is transferred is transported into a pressure contact portion (nip portion) of a pair of fixing rolls in the fixing device 28 (an example of a fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
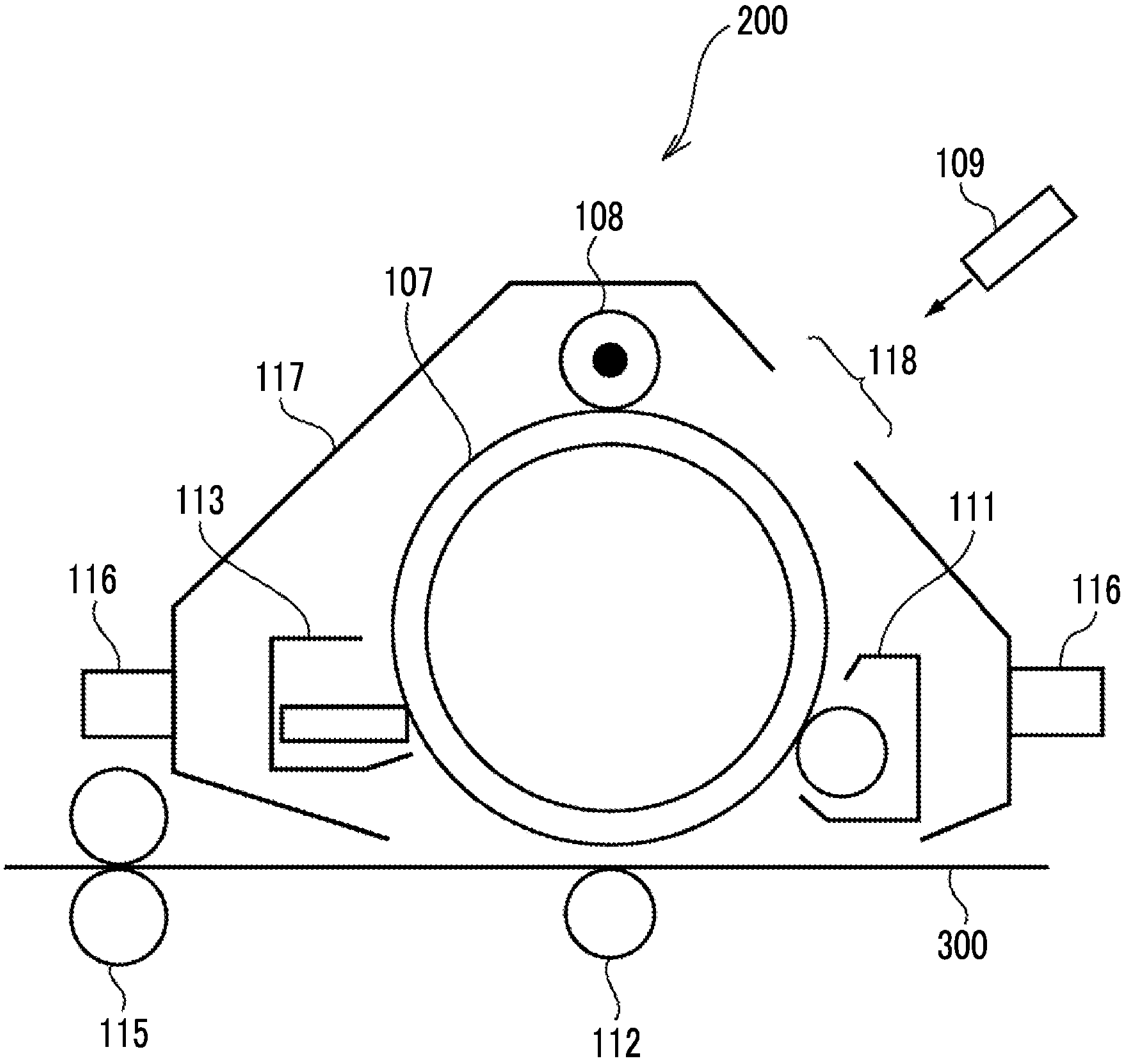
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the electrostatic charge image developing toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8P, 8M, 8C, 8G, and 8K to be detachable from the apparatus. The developing devices 4Y, 4P, 4M, 4C, 4G, and 4K are connected to toner cartridges corresponding to the respective colors by a toner supply pipe not shown in the drawing. In a case where the amount of the toner contained in the container of the toner cartridge is low, the toner cartridge is replaced. The toner cartridge 8G is an example of the toner cartridge according to the present exemplary embodiment, and has a container that contains the electrostatic charge image developing toner according to the present exemplary embodiment. The toner cartridges 8P, 8Y, 8M, 8C, and 8K have containers that contain pink, yellow, magenta, cyan, and black toners respectively.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Preparation of Colorant Particle Dispersion (1)

Fluorescent yellow pigment (C.I. Pigment Yellow 101 (manufactured by Radiant Color, Radglo VSF-0-01, emission peak wavelength 520 nm)): 70 parts Anionic surfactant (manufactured by DKS Co. Ltd., NEOGEN RK): 30 parts (concentration of solid content 20%)

Deionized water: 200 parts

The above components are mixed together and pulverized with a continuous key mill (KMC-3) to 0.5 μm, and the amount of solid content is adjusted to 20% by mass, thereby obtaining a colorant particle dispersion (1).

Preparation of Colorant Particle Dispersion (2)

Non-fluorescent green pigment (C.I. Pigment Green 36 (manufactured by TOYOCOLOR CO., LTD., LIONOL GREEN 8624, reflection peak wavelength 510 nm)): 70 parts Anionic surfactant (manufactured by DKS Co. Ltd., NEOGEN RK): 30 parts (concentration of solid content 20%)

Deionized water: 200 parts

The above components are mixed together and pulverized with a continuous key mill (KMC-3) to 0.2 μm, and the amount of solid content is adjusted to 20% by mass, thereby obtaining a colorant particle dispersion (2).

Preparation of Resin Particle Dispersion (1)

Terephthalic acid: 30 parts by mol

Fumaric acid: 70 parts by mol

Ethylene oxide adduct of bisphenol A: 5 parts by mol

Propylene oxide adduct of bisphenol A: 95 parts by mol

The above materials are put in a flask equipped with a stirrer, a nitrogen introduction tube, a temperature sensor, and a rectifying column, the temperature is raised to 220° C. for an hour, and titanium tetraethoxide is added thereto in an amount of 1 part with respect to 100 parts of the above materials. While the generated water is being distilled off, the temperature is raised to 230° C. for 30 minutes, a dehydrocondensation reaction is continued for 1 hour at 230° C., and then the reactant is cooled. In this way, a polyester resin having a weight-average molecular weight of 18,000 and a glass transition temperature of 60° C. is obtained.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes. Thereafter, the container is cleaned out by dry nitrogen purging, and in a state where the mixed solution is being stirred at a temperature kept at 40° C., 400 parts of deionized water is added dropwise thereto at a rate of 2 parts/min. After the dropwise addition ends, the temperature is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less. Deionized water is added to the resin particle dispersion, and the solid content thereof is adjusted to 20% by mass, thereby obtaining a resin particle dispersion (1).

Preparation of Release Agent Particle Dispersion (1)

- Paraffin wax (manufactured by NIPPON SEIRO CO., LTD., HNP-9): 100 parts
- Anionic surfactant (manufactured by DKS Co. Ltd., NEOGEN RK): 1 part
- Deionized water: 350 parts The above materials are mixed together, heated to 100° C., and dispersed using a homogenizer (IKA, trade name ULTRA-TURRAX T50). Then, by using Munton Gorlin high-pressure homogenizer (Gorlin), dispersion treatment is performed, thereby obtaining a release agent particle dispersion (1) (solid content of 20% by mass) in which release agent particles having a volume-average particle size of 200 nm are dispersed.

Preparation of Toner Particles (1)

- Resin particle dispersion (1): 400 parts
- Colorant particle dispersion (1): 50 parts
- Colorant particle dispersion (2): 25 parts
- Release agent particle dispersion (1): 25 parts
- Anionic surfactant (DKS Co. Ltd., NEOGEN RK, 20%): 10 parts The above materials are put in a round flask made of stainless steel, 0.1 N (=mol/L) nitric acid is added thereto to adjust the pH to 3.5, and then 30 parts of an aqueous nitric acid solution having a polyaluminum chloride concentration of 10% by mass is added thereto. Then, the obtained solution is dispersed at a liquid temperature of 30° C. by using a homogenizer (manufactured by IKA, trade name ULTRA-TURRAX T50), then heated to 45° C. in an oil bath for heating, and kept as it is for 30 minutes. Subsequently, 50 parts of the resin particle dispersion (1) is added thereto, the reaction solution is kept as it is for 1 hour, a 0.1N aqueous sodium hydroxide solution is added thereto such that the pH is adjusted to 8.5, and the reaction solution is then heated to 84° C. and kept as it is for 2.5 hours. Thereafter, the reaction solution is cooled to 20° C. at a rate of 20° C./min, the solids are separated by filtration, thoroughly washed with deionized water, and dried, thereby obtaining toner particles (1). The volume-average particle size of the toner particles (1) is 5.8 m.

Preparation of Carrier 1

- Ferrite particles (average particle size 35 m): 100 parts
- Toluene: 14 parts
- Polymethylmethacrylate (MMA, weight-average molecular weight 75,000): 5 parts
- Carbon black: 0.2 parts (VXC-72, manufactured by Cabot Corporation, volume resistivity: 100 Ω·cm or less)

The above materials excluding the ferrite particles are dispersed with a sand mill, thereby preparing a dispersion. The dispersion is put in a vacuum deaerating kneader together with the ferrite particles, and dried under reduced pressure while being stirred, thereby obtaining a carrier 1.

Preparation of Toner

Hydrophobic silica (manufactured by Nippon Aerosil Co., Ltd., RY50) and hydrophobic titanium oxide (manufactured by Nippon Aerosil Co., Ltd., T805) are used in an amount of 1.5 parts by mass and 1.0 parts by mass respectively with respect to 100 parts by mass of the obtained toner particles (1), and these are mixed and blended together for 30 seconds by using a sample mill at 10,000 revolutions per minute (rpm). Then, the obtained mixture is sieved using a vibration sieve having an opening size of 45 m, thereby preparing a toner 1 (electrostatic charge image developing toner). The volume-average particle size of the obtained toner 1 is 5.8 μm.

Preparation of Electrostatic Charge Image Developer

The toner (8 parts) and 92 parts of the carrier are mixed together by using a V blender, thereby preparing a developer 1 (electrostatic charge image developer).

Measurement of Spectral Reflectance

The spectral reflectance of the toner image is measured by the following method.

In a room in an environment at a temperature of 25° C. and a humidity of 60% RH, the body, developing device, and toner cartridge of DocuCentre Color 400 CP manufactured by FUJIFILM Business Innovation Corp. are thoroughly cleaned by removing developers and toners set in the printer, and then the toner prepared as above is put in the toner cartridge.

Then, the amount of developing toner of a 100% solid color image on OS coated paper manufactured by FUJIFILM Business Innovation Corp. is adjusted to 4.0 g/$m^2$, and an image consisting of only toner and having a size of 5 cm×5 cm is prepared. By using X-Rite 939 (manufactured by X-Rite, Inc., aperture 4 mm), the spectral reflectance in a visible region is measured at 10 random locations within the surface of the image, and the average of the spectral reflectance of the reflection peak is calculated. The evaluation criteria are as follows.

- A: The spectral reflectance of the peak wavelength is 80% or more.
- B: The spectral reflectance of the peak wavelength is 70% or more and less than 80%.

C: The spectral reflectance of the peak wavelength is less than 70%.

Bending Resistance of Image

In each of examples and comparative examples, the fixed toner image prepared for measuring the spectral reflectance is folded, the fold is rubbed back and forth 5 times with a 3 kg weight, the paper is unfolded, and the image defect of the folded portion is visually evaluated.

The evaluation criteria are as follows.

A: There is no image defect, the image remains intact and has no problem.

B: An image defect having a line width of 0.2 mm or less is observed, but there is no problem in actual use.

C: An image defect having a line width of more than 0.2 mm is observed, and there is a problem in actual use.

Peelability

By using DocuCentre Color 400 manufactured by FUJIFILM Business Innovation Corp., an unfixed image is printed out in a toner application amount adjusted to 4.5 g/$m^2$. As a recording medium, film synthetic paper (YUPO Paper, manufactured by YUPO CORPORATION) is used. The printed image is a 50 mm×50 mm solid image having an image density of 100%. A fixing evaluation device is prepared by detaching a fixing device from ApeosPortIV C3370 manufactured by FUJIFILM Business Innovation Corp., and modifying the machine such that the fixing temperature can be changed. The fixing evaluation device has a nip width of 6 mm, a nip pressure of 1.6 kgf/$cm^2$, and a process speed of 175 mm/sec. The unfixed image is fixed at intervals of 5° C. from a fixing temperature of 160° C. to 220° C., whether or not hot offset occurs is visually checked, and the lowest temperature at which hot offset occurs is evaluated as a hot offset onset temperature. The evaluation criteria are as follows.

A: The hot offset onset temperature is 200° C. or higher.

B: The hot offset onset temperature is 170° C. or higher and lower than 200° C.

C: The hot offset onset temperature is lower than 170° C.

Examples 2 to 18 and Comparative Examples 1 to 8

The preparation of toners and developers and the evaluation are performed in the same manner as in Example 1, except that the type and content of the non-fluorescent organic pigment and the type and content of the fluorescent organic pigment are changed as shown in Table 1 or 2.

TABLE 1

| | Non-fluorescent organic pigment | | Fluorescent organic pigment | | Difference in specific gravity D1 − D2 ($g/cm^3$) | Content of non-fluorescent organic pigment (% by mass) | Content of fluorescent organic pigment (% by mass) |
|---|---|---|---|---|---|---|---|
| | Type | Specific gravity D1 ($g/cm^3$) | Type | Specific gravity D2 ($g/cm^3$) | | | |
| Example 1 | PG36 | 2.9 | PY101 | 1.34 | 1.56 | 4 | 8 |
| Example 2 | PG7 | 2.1 | PY101 | 1.34 | 0.76 | 4 | 8 |
| Comparative Example 1 | PB15:3 | 1.6 | PY101 | 1.34 | 0.26 | 4 | 8 |
| Example 3 | PG36 | 2.9 | VSF-0-05 | 1.7 | 1.2 | 4 | 8 |
| Comparative Example 2 | PG7 | 2.1 | VSF-0-05 | 1.7 | 0.4 | 4 | 8 |
| Example 4 | PG7 | 2.1 | PY101 | 1.34 | 0.76 | 4 | 12 |
| Comparative Example 3 | PB15:3 | 1.6 | PY101 | 1.34 | 0.26 | 4 | 18 |
| Example 5 | PG36 | 2.9 | VSF-0-03 | 1.7 | 1.2 | 4 | 10 |
| Comparative Example 4 | PG7 | 2.1 | VSF-0-05 | 1.7 | 0.4 | 4 | 18 |
| Comparative Example 5 | PG36 | 2.9 | PY101 | 1.34 | 1.56 | 4 | 18 |
| Example 6 | PG36 | 2.9 | PY101 | 1.34 | 1.56 | 4 | 16 |
| Example 7 | PG36 | 2.9 | PY101 | 1.34 | 1.56 | 1.7 | 3.3 |
| Comparative Example 6 | PG36 | 2.9 | PY101 | 1.34 | 1.56 | 1.3 | 2.7 |
| Example 8 | PG36 | 2.9 | PY101 | 1.34 | 1.56 | 4 | 8 |
| Example 9 | PG36 | 2.9 | PY101 | 1.34 | 1.56 | 4 | 8 |
| Example 10 | PG36 | 2.9 | PY101 | 1.34 | 1.56 | 4 | 8 |
| Example 11 | PG36 | 2.9 | PY101 | 1.34 | 1.56 | 4 | 8 |
| Example 12 | PG36 | 2.9 | PY101 | 1.34 | 1.56 | 4 | 8 |
| Example 13 | PG36 | 2.9 | PY101 | 1.34 | 1.56 | 4 | 8 |
| Example 14 | PG36 | 2.9 | PY101 | 1.34 | 1.56 | 4 | 8 |
| Example 15 | PG36 | 2.9 | PY101 | 1.34 | 1.56 | 4 | 8 |

TABLE 1-continued

| | Total content of organic colorants (% by mass) | Volume-average particle size of non-fluorescent organic pigment (nm) | Volume-average particle size of fluorescent organic pigment (nm) | Spectral reflectance (%) | | Bending resistance | Peelability |
|---|---|---|---|---|---|---|---|
| Example 1 | 12 | 150 | 300 | A | 93 | A | A |
| Example 2 | 12 | 150 | 300 | A | 80 | A | A |
| Comparative Example 1 | 12 | 150 | 300 | C | 45 | A | A |
| Example 3 | 12 | 150 | 300 | A | 85 | A | A |
| Comparative Example 2 | 12 | 150 | 300 | C | 50 | A | A |
| Example 4 | 16 | 150 | 300 | A | 95 | A | A |
| Comparative Example 3 | 22 | 150 | 300 | B | 70 | C | A |
| Example 5 | 14 | 150 | 300 | A | 95 | A | A |
| Comparative Example 4 | 22 | 150 | 300 | B | 70 | C | A |
| Comparative Example 5 | 22 | 150 | 300 | A | 109 | C | A |
| Example 6 | 20 | 150 | 300 | A | 107 | B | A |
| Example 7 | 5 | 150 | 300 | A | 95 | A | B |
| Comparative Example 6 | 4 | 150 | 300 | A | 95 | A | C |
| Example 8 | 12 | 150 | 900 | A | 103 | A | B |
| Example 9 | 12 | 150 | 800 | A | 102 | A | A |
| Example 10 | 12 | 150 | 500 | A | 98 | A | A |
| Example 11 | 12 | 150 | 100 | A | 89 | A | A |
| Example 12 | 12 | 150 | 30 | A | 83 | A | A |
| Example 13 | 12 | 350 | 20 | A | 81 | B | A |
| Example 14 | 12 | 300 | 300 | A | 92 | A | A |
| Example 15 | 12 | 400 | 300 | A | 89 | A | A |

TABLE 2

| | Non-fluorescent organic pigment | | Fluorescent organic pigment | | Difference | Content of non-fluorescent | Content of fluorescent |
|---|---|---|---|---|---|---|---|
| | Type | Specific gravity D1 (g/cm$^3$) | Type | Specific gravity D2 (g/cm$^3$) | in specific gravity D1 − D2 (g/cm$^3$) | organic pigment (% by mass) | organic pigment (% by mass) |
| Example 16 | PR216 | 2.8 | PY101-BF2 | 1.3 | 1.5 | 4 | 8 |
| Example 17 | PR168 | 2.1 | PY101-BF2 | 1.3 | 0.8 | 4 | 8 |
| Comparative Example 7 | PR3 | 1.4 | PY101-BF2 | 1.3 | 0.1 | 4 | 8 |
| Example 18 | PR168 | 2.1 | PY101-BF2 | 1.3 | 0.8 | 4 | 13 |
| Comparative Example 8 | PR3 | 1.4 | PY101-BF2 | 1.3 | 0.1 | 4 | 19 |

| | Total content of organic colorants (% by mass) | Volume-average particle size of non-fluorescent organic pigment (nm) | Volume-average particle size of fluoresecent organic pigment (nm) | Spectral reflectance (%) | | Bending resistance | Peelability |
|---|---|---|---|---|---|---|---|
| Example 16 | 12 | 150 | 300 | A | 95 | A | A |
| Example 17 | 12 | 150 | 300 | A | 80 | A | A |
| Comparative Example 7 | 12 | 150 | 300 | C | 43 | A | A |
| Example 18 | 17 | 150 | 300 | A | 95 | B | A |
| Comparative Example 8 | 23 | 150 | 300 | B | 70 | C | A |

In Tables 1 and 2, all of the content of the non-fluorescent organic pigment, the content of the fluorescent organic pigment, and the total content of the organic colorant are contents with respect to the total mass of the toner particles.

Details of the abbreviations in Tables 1 and 2 are as below.

PG36: C.I. Pigment Green 36 (manufactured by TOYOCOLOR CO., LTD., LIONOL GREEN 8624, specific gravity 2.9), a non-fluorescent organic copper phthalocyanine pigment having a chlorine atom and a bromine atom PG7: C.I. Pigment Green 7 (manufactured by TOYOCOLOR CO., LTD., LIONOL GREEN 8390, specific gravity 2.1), a non-fluorescent organic copper phthalocyanine pigment having a chlorine atom PB15:3: C.I. Pigment Blue 15:3 (manufactured by TOYOCOLOR CO., LTD., LIONOL BLUE FG-7330, specific gravity 1.6), a non-fluorescent organic copper phthalocyanine pigment having no halogen atom PR216: C.I. Pigment Red 216 (manufactured by BASF SE, Paliogen Red L3530, specific gravity 2.8), the following compound, an anthraquinone-based non-fluorescent organic pigment PR168: C.I. Pigment Red 168 (manufactured by Clariant AG, Hostaperm Scarlet GO, specific gravity 2.1), the following compound, an anthraquinone-based non-fluorescent organic pigment PR3: C.I. Pigment Red 3 (manufactured by Clariant AG, Hansa Scarlet RNC, specific gravity 1.4), the following compound, an azo-based non-fluorescent organic pigment PY101: C.I. Pigment Yellow 101 (manufactured by Radiant Color, Radglo VSF-0-01, emission peak wavelength 520 nm), an azomethine-based fluorescent organic pigment VSF-0-05: the following compound (manufactured by Radiant Color, Radglo VSF-0-05, emission peak wavelength 519 nm), an isoindolinone-based fluorescent organic pigment PY101-BF2: a boron difluoride derivative of C.I. Pigment Yellow 101 (emission peak wavelength 570 nm), the following compound, an azomethine-based fluorescent organic pigment

PR216

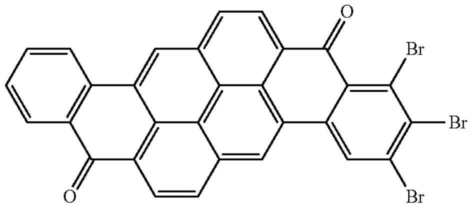

PR168

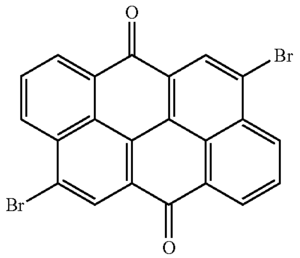

-continued

PR3

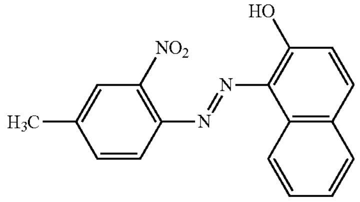

VSF-0-05

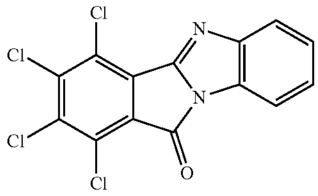

PY101-BF2

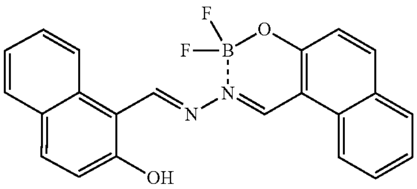

Example 101

Image Formation by Actual Machine

An electrophotographic and intermediate transfer-type 6-unit tandem image forming apparatus is prepared. The 6 developing devices are filled with a pink developer, a yellow developer, a magenta developer, a cyan developer, a black developer, and a green developer (developer of Example 1) respectively. Then, based on the image data obtained by color-separating RGB data into the above 6 colors, an image is formed on A4 size coated paper. The obtained image has excellent color reproducibility close to the original RGB data.

(((1))) An electrostatic charge image developing toner comprising:

toner particles that contain an organic colorant and a binder resin, wherein the organic colorant includes a non-fluorescent organic pigment and a fluorescent organic pigment, a total content of the organic colorant is 5% by mass or more and 20% by mass or less with respect to a total mass of the toner particles, and a specific gravity D1 of the non-fluorescent organic pigment and a specific gravity D2 of the fluorescent organic pigment satisfy both of Formulas (1) and (2), $$D1 \geq 2.0 \quad \text{Formula (1)}$$

$$D1 - D2 \geq 0.6 \quad \text{Formula (2).}$$

(((2))) The electrostatic charge image developing toner according to (((1))), wherein a volume-average particle size D50v of the fluorescent organic pigment is 30 nm or more and 800 nm or less.

(((3))) The electrostatic charge image developing toner according to (((2))), wherein the volume-average particle size D50v of the fluorescent organic pigment is 100 nm or more and 500 nm or less.

(((4))) The electrostatic charge image developing toner according to any one of (((1))) to (((3))), wherein a volume-average particle size of the non-fluorescent organic pigment is equal to or less than a volume-average particle size of the fluorescent organic pigment.

(((5))) The electrostatic charge image developing toner according to any one of (((1))) to (((4))), wherein the specific gravity D1 of the non-fluorescent organic pigment satisfies Formula (1A), $$D1 \geq 2.5 \quad \text{Formula (1A).}$$

(((6))) The electrostatic charge image developing toner according to any one of (((1))) to (((5))), wherein the specific gravity D1 of the non-fluorescent organic pigment and the specific gravity D2 of the fluorescent organic pigment satisfy Formula (2A), $$D1-D2 \geq 0.75 \quad \text{Formula (2A).}$$

(((7))) The electrostatic charge image developing toner according to (((6))), wherein the specific gravity D1 of the non-fluorescent organic pigment and the specific gravity D2 of the fluorescent organic pigment satisfy Formula (2B), $$D1-D2 \geq 1.0 \quad \text{Formula (2B).}$$

(((8))) The electrostatic charge image developing toner according to any one of (((1))) to (((7))), wherein the non-fluorescent organic pigment has a halogen atom.

(((9))) The electrostatic charge image developing toner according to (((8))), wherein the halogen atom is at least one kind of atom selected from the group consisting of a chlorine atom and a bromine atom.

(((10))) An electrostatic charge image developer comprising:

the electrostatic charge image developing toner according to any one of (((1))) to (((9))).

(((11))) Atoner cartridge comprising:

a container that contains the electrostatic charge image developing toner according to any one of (((1))) to (((9))), wherein the toner cartridge is detachable from an image forming apparatus.

(((12))) A process cartridge comprising:

a developing unit that contains the electrostatic charge image developer according to (((10))) and develops an electrostatic charge image formed on a surface of an image holder as a toner image by using the electrostatic charge image developer, wherein the process cartridge is detachable from an image forming apparatus.

(((13))) An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to (((10))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((14))) An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((10)));

transferring the toner image formed on the surface of the image holder to a surface of a recording medium; and fixing the toner image transferred to the surface of the recording medium.

(((15))) An image forming apparatus comprising:

first to sixth electrophotographic image forming units forming images of each of colors of pink, yellow, magenta, cyan, black, and green, wherein an image forming unit that forms a green image contains the electrostatic charge image developer according to (((10))).

(((16))) An image forming method comprising:

forming first to sixth electrophotographic images of each of colors of pink, yellow, magenta, cyan, black, and green, wherein the electrostatic charge image developer according to (((10))) is used in forming a green image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles that contain an organic colorant and a binder resin, wherein the organic colorant includes a non-fluorescent organic pigment and a fluorescent organic pigment, a total content of the organic colorant is 5% by mass or more and 20% by mass or less with respect to a total mass of the toner particles, and a specific gravity D1 of the non-fluorescent organic pigment and a specific gravity D2 of the fluorescent organic pigment satisfy both of Formulas (1) and (2), $$D1 \geq 2.0 \quad \text{Formula (1)}$$

$$2.0 \geq D1-D2 \geq 0.6 \quad \text{Formula (2).}$$

2. The electrostatic charge image developing toner according to claim 1, wherein a volume-average particle size D50v of the fluorescent organic pigment is 30 nm or more and 800 nm or less.

3. The electrostatic charge image developing toner according to claim 2, wherein the volume-average particle size D50v of the fluorescent organic pigment is 100 nm or more and 500 nm or less.

4. The electrostatic charge image developing toner according to claim 1, wherein a volume-average particle size of the non-fluorescent organic pigment is equal to or less than a volume-average particle size of the fluorescent organic pigment.

5. An electrostatic charge image developing toner comprising:

toner particles that contain an organic colorant and a binder resin, wherein the organic colorant includes a non-fluorescent organic pigment and a fluorescent organic pigment, a total content of the organic colorant is 5% by mass or more and 20% by mass or less with respect to a total mass of the toner particles, a specific gravity D1 of the non-fluorescent organic pigment and a specific gravity D2 of the fluorescent organic pigment satisfy both of Formulas (1) and (2), and a volume-average particle size D50v of the fluorescent organic pigment is 100 nm or more and 500 nm or less, $$3.0 \geq D1 \geq 2.0 \quad \text{Formula (1)}$$

$$D1 - D2 \geq 0.6 \quad \text{Formula (2).}$$

6. An electrostatic charge image developing toner comprising:

toner particles that contain an organic colorant and a binder resin, wherein the organic colorant includes a non-fluorescent organic pigment and a fluorescent organic pigment, a total content of the organic colorant is 5% by mass or more and 20% by mass or less with respect to a total mass of the toner particles, a specific gravity D1 of the non-fluorescent organic pigment and a specific gravity D2 of the fluorescent organic pigment satisfy both of Formulas (1) and (2), a volume-average particle size D50v of the fluorescent organic pigment is 100 nm or more and 500 nm or less, and a volume-average particle size of the non-fluorescent organic pigment is equal to or less than a volume-average particle size of the fluorescent organic pigment, $$3.0 \geq D1 \geq 2.0 \quad \text{Formula (1)}$$

$$2.0 \geq D1 - D2 \geq 0.6 \quad \text{Formula (2).}$$

7. The electrostatic charge image developing toner according to claim 1, wherein the fluorescent organic pigment is at least one kind of compound selected from the group consisting of the azomethine compound (1), the azomethine compound (2), the azomethine compound (3), and boron difluoride derivatives of these, Azomethine compound (1)

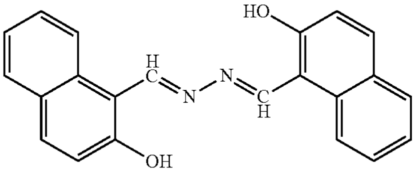

-continued

Azomethine compound (2)

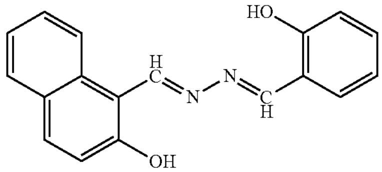

Azomethine compound (3)

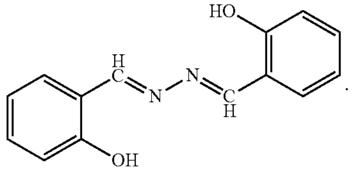

8. The electrostatic charge image developing toner according to claim 1, wherein the specific gravity D1 of the non-fluorescent organic pigment and the specific gravity D2 of the fluorescent organic pigment satisfy Formula (2A), $$2.0 \geq D1 - D2 \geq 0.75 \quad \text{Formula (2A).}$$

9. The electrostatic charge image developing toner according to claim 8, wherein the specific gravity D1 of the non-fluorescent organic pigment and the specific gravity D2 of the fluorescent organic pigment satisfy Formula (2B), $$2.0 \geq D1 - D2 \geq 1.0 \quad \text{Formula (2B).}$$

10. The electrostatic charge image developing toner according to claim 1, wherein the non-fluorescent organic pigment has a halogen atom.

11. The electrostatic charge image developing toner according to claim 10, wherein the halogen atom is at least one kind of atom selected from the group consisting of a chlorine atom and a bromine atom.

12. An electrostatic charge image developer comprising:

the electrostatic charge image developing toner according to claim 1.

13. An electrostatic charge image developer comprising:

the electrostatic charge image developing toner according to claim 5.

14. An electrostatic charge image developer comprising:

the electrostatic charge image developing toner according to claim 6.

15. A toner cartridge comprising:

a container that contains the electrostatic charge image developing toner according to claim 1, wherein the toner cartridge is detachable from an image forming apparatus.

16. A process cartridge comprising:

a developing unit that contains the electrostatic charge image developer according to claim 12 and develops an electrostatic charge image formed on a surface of an image holder as a toner image by using the electrostatic charge image developer, wherein the process cartridge is detachable from an image forming apparatus.

17. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 12 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

18. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 12;

transferring the toner image formed on the surface of the image holder to a surface of a recording medium; and fixing the toner image transferred to the surface of the recording medium.

19. An image forming apparatus comprising:

first to sixth electrophotographic image forming units forming images of each of colors of pink, yellow, magenta, cyan, black, and green, each of the first to sixth electrophotographic image forming units comprising:

an image holder;

a charging unit that charges a surface of the image holder, an electrostatic charge image forming unit that forms an electrostatic charge image on the charged surface of the image holder;

a developing unit that develops the electrostatic charge image formed on the surface of the image holder as a toner image;

a transfer unit that transfers the toner image formed on the surface of the image holder to a surface of a recording medium; and a fixing unit that fixes the toner image transferred to the surface of the recording medium, wherein an image forming unit that forms a green image contains the electrostatic charge image developer according to claim 12.

20. An image forming method comprising:

charging a surface of an image holder;

forming an electrostatic charge image on the charged surface of the image holder;

developing the electrostatic charge image as a toner image, and forming first to sixth electrophotographic images of each of colors of pink, yellow, magenta, cyan, black, and green, transferring the toner image to a surface of a recording medium; and fixing the toner image transferred to the surface of the recording medium, wherein the electrostatic charge image developer according to claim 12 is used in forming a green image.

* * * * *